US009555663B2

(12) United States Patent
Yu et al.

(10) Patent No.: US 9,555,663 B2
(45) Date of Patent: Jan. 31, 2017

(54) AUTOMOTIVE WHEEL WITH CAVITY BETWEEN BOLT HOLES IN HUB MOUNTING SECTION

(71) Applicants: Dong Gi Yu, Gwangju (KR); Kwan Mug Kim, Daejeon (KR)

(72) Inventors: Dong Gi Yu, Gwangju (KR); Kwan Mug Kim, Daejeon (KR)

(73) Assignee: Dong Gi Yu, Gwangju (KR)

( * ) Notice: Subject to any disclaimer, the term of this patent is extended or adjusted under 35 U.S.C. 154(b) by 0 days.

(21) Appl. No.: 14/727,879

(22) Filed: Jun. 2, 2015

(65) Prior Publication Data
US 2016/0311250 A1    Oct. 27, 2016

(30) Foreign Application Priority Data

Apr. 27, 2015  (KR) .................. 10-2015-0059075

(51) Int. Cl.
| | | |
|---|---|---|
| B60B 1/06 | (2006.01) | |
| B60B 3/00 | (2006.01) | |
| B60B 3/12 | (2006.01) | |
| B60B 1/00 | (2006.01) | |
| B60B 3/10 | (2006.01) | |
| B60B 3/16 | (2006.01) | |

(52) U.S. Cl.
CPC .............. *B60B 1/06* (2013.01); *B60B 1/006* (2013.01); *B60B 3/004* (2013.01); *B60B 3/008* (2013.01); *B60B 3/12* (2013.01); *B60B 3/10* (2013.01); *B60B 3/16* (2013.01); *B60B 2900/111* (2013.01); *B60B 2900/131* (2013.01); *B60B 2900/133* (2013.01); *Y02T 10/86* (2013.01)

(58) Field of Classification Search
CPC ...... B60B 1/06; B60B 1/006; B60B 2900/133; B60B 2900/111
USPC ........................................ 301/37.107, 37.108
See application file for complete search history.

(56) References Cited

U.S. PATENT DOCUMENTS

| | | | | |
|---|---|---|---|---|
| 4,659,148 A | * | 4/1987 | Grill ........................ | B60B 5/02 301/37.26 |
| 7,097,730 B2 | * | 8/2006 | Woelfel .............. | B29C 44/1233 156/290 |
| 7,246,860 B1 | * | 7/2007 | Seitz ..................... | B60B 7/0046 220/789 |
| 2010/0231029 A1 | * | 9/2010 | Russell .................... | B60B 5/02 301/37.31 |

FOREIGN PATENT DOCUMENTS

| | | | | |
|---|---|---|---|---|
| JP | 2001113903 A | * | 4/2001 | |
| JP | EP 1580027 A2 | * | 9/2005 | ........... B22D 15/005 |
| KR | 19990062973 A | | 7/1999 | |

(Continued)

*Primary Examiner* — S. Joseph Morano
*Assistant Examiner* — Jean Charleston
(74) *Attorney, Agent, or Firm* — Mark M. Friedman

(57) ABSTRACT

There is provided an automotive wheel with a cavity between the bolt holes in a hub mounting section, and more particularly, to an automotive wheel with a cavity between the bolt holes in a hub mounting section, wherein a cavity between the bolt holes in a hub mounting section structured to secure an automotive wheel to a wheel hub is uniformly formed to reduce the weight and noise of the automotive wheel, and wherein a damper rubber is inserted into the cavity to reduce the vibration and noise generated during driving an automobile.

7 Claims, 7 Drawing Sheets

(56) References Cited

FOREIGN PATENT DOCUMENTS

| | | | |
|---|---|---|---|
| KR | 20060044653 | A | 5/2006 |
| KR | 20070053386 | A | 5/2007 |
| KR | 20130044465 | A | 5/2013 |
| WO | 0076786 | A1 | 12/2000 |

* cited by examiner

AUTOMOTIVE WHEEL WITH CAVITY BETWEEN BOLT HOLES IN HUB MOUNTING SECTION

CROSS-REFERENCE TO RELATED APPLICATION

This application claims the benefit of Korean Patent Application No. 10-2015-0059075, filed on May 27, 2015 the disclosure of which is hereby incorporated herein by reference in its entirety.

BACKGROUND OF THE INVENTION

1. Field of the Invention

The present invention relates to an automotive wheel with a cavity between the bolt holes in a hub mounting section, and more particularly, to an automotive wheel with a cavity between the bolt holes in a hub mounting section, wherein a cavity between the bolt holes in a hub mounting section structured to secure an automotive wheel to a wheel hub is uniformly formed to reduce the weight and noise of the automotive wheel, and wherein a damper rubber is inserted into the cavity to reduce the vibration and noise generated during driving an automobile.

2. Description of the Related Art

Automotive wheels are manufactured using metal materials, usually steel or aluminium. Generally, this automotive wheel is secured to an automotive wheel hub comprising a brake drum or brake disk by a spherical head screw or conical head screw.

To improve the fuel-efficiency of an automobile through decreasing the weight of the automobile, aluminium which is a light material has been used for an automotive wheel. Further, a technology to structurally lighten the weight has been also developed.

Usually, when a wheel is designed, it is considered to primarily satisfy the strength requirements. The structures, such as the thicknesses and designs of a hub mounting section 21 and a spoke section 22 of a disk member 2, have been designed to satisfy the minimum required strength of the wheel. Then, a process for secondary weight lightening (decrease of weight) has been performed inside the hub mounting section 21 and the spoke section 22 of the wheel to improve the fuel-efficiency.

However, as the wheel weight has been lightened through the aforementioned ways, the stiffness becomes insufficient, causing vibration and noise of the wheel during the driving of the automobile. To prevent these problems, casting thickness is again provided inside the hub mounting section 21 and the spoke section 22 of the wheel. Even the entire shape of the disk member 2 is thickened to increase the unnecessary stiffness rather than the minimum required strength. This again increases the weight and therefore, it is restricted in the improvement of fuel-efficiency.

Korean Patent Published Application No. 10-2006-0044653 (hereinafter, referred to as 'Prior Art 1') discloses a technology to decrease weight and block noise by forming a hollow chamber in a rim. The technology of forming a hollow chamber in the rim and spoke is disclosed in not only Prior Art 1 but also Korean Patent Published Application Nos. 1999-0062973 and 10-2013-0044465. The method of forming the hollow chamber has the effect of reducing weight and absorbing noise but it has a problem in that durability is weakened.

Korean Patent Published Application No. 10-2007-0053386 (hereinafter, referred to as 'Prior Art 2') discloses technology to absorb noise and vibration by forming a hollow chamber in a rim and filling it with an aluminum foam core. The technology of forming a hollow chamber in the rim and spoke and filling it with the foam core has a better effect of absorbing noise in comparison with Prior Art 1 but less effect of reducing weight.

PRIOR ART DOCUMENT

Patent Document (Patent Document 1) Prior Art 1: Korean Patent Published Application No. 10-2006-0044653
(Patent Document 2) Prior Art 2: Korean Patent Published Application No. 10-2007-0053386
(Patent Document 3) Prior Art 3: Korean Patent Published Application No. 1999-0062973
(Patent Document 4) Prior Art 4: Korean Patent Published Application No. 10-2013-0044465

SUMMARY OF THE INVENTION

Therefore, it is an object of the present invention to solve the above problems and to provide an automotive wheel with a cavity between the bolt holes in a hub mounting section which is designed to decrease weight by maintaining the high tilting strength and high torsional strength and the tightening torque of a wheel bolt.

Especially, the present invention is to provide a structure to decrease the weight in a hub mounting section rather than a rim section and a spoke section, thereby having the effects of easy manufacturing, high cost-effectiveness and decreased vibration and noise in comparison with the conventional art.

In accordance with an embodiment of the present invention, there is provided an automotive wheel with a cavity between the bolt holes in a hub mounting section, comprising a disk member through which an axle is connected and a rim member on which a tire is to be mounted, the disk member includes: a hub mounting section in a circular shape through which the axle is connected and a plurality of spokes positioned in a radial shape from an outer circumferential edge of the hub mounting section, the hub mounting section further includes: a hub hole in its center; a plurality of bolt holes positioned, at equally spaced intervals, in a radial shape outside the hub hole; and a plurality of cavities positioned, at equally spaced intervals proximate the bolt holes, and the cavity includes an entrance formed in the back.

Each of the cavities may be circular, oval or polygonal in cross section.

The automotive wheel of the present invention may further comprise a damper rubber inserted into each cavity.

The damper rubber may be any one of chloroprene rubber (CR), nitrile rubber (NBR: nitrile-butadiene rubber), ethylene propylene rubber (EPDM: ethylene propylene diene monomer), fluororubber (FPM; fluorocarbon rubber), polybutadiene rubber (BR), styrene-butadiene rubber (SBR), isobutylene isoprene rubber (IIR) and chlorosulphonated polyethylene (CSM) rubber.

Each cavity may include an extension portion inside.

The damper rubber may comprise: a contact portion to be in contact with the cavity; an incline portion to be tapered such that an inner diameter is widened from the contact portion; a shaft diameter portion to narrow the inner diameter from the incline portion; and a vertical portion to be formed vertically from the shaft diameter portion.

The hub mounting section in the back may further comprise: a drain hole formed around each cavity so as to be recessed from the flat surface of the hub mounting section in the back; and drain slits formed in the drain hole in a radial shape towards the center of the axle.

BRIEF DESCRIPTION OF THE DRAWINGS

The above and other features and advantages of the present invention will become more apparent to those of ordinary skill in the art by describing in detail the preferred embodiments thereof with reference to the attached drawings in which.

DESCRIPTION OF NUMBERS FOR CONSTITUENTS IN DRAWINGS

| 1: tire | 2: disk member | 3: rim member |
|---|---|---|
| 21: hub mounting section | 210: hub hole | 220: bolt hole |
| 230: drain hole | 240: drain slit | 300: cavity |
| 310: cavity entrance | 320: extension portion | |
| 330: contact portion | | |
| 40: damper rubber | 41: contact portion | 42: incline portion |
| 43: shaft diameter portion | 44: vertical portion | |

DETAILED DESCRIPTION OF THE PREFERRED EMBODIMENT

All terms used herein have the same meaning as commonly used and understand by one of ordinary skill in the art to which this invention belongs. In some specific cases, some terms are discretionally selected by an applicant of the invention. In these cases, the terms should be interpreted as having their meaning in the context of the detailed description to work the invention rather than the simple names of the terms.

In the description of an embodiment(s) of the present invention, when an automotive wheel is mounted onto an automobile, a side of the wheel being visible to the eyes is called the "design face". The design face is also called the "front" and the opposite side of the design face is called the "back".

A direction towards the central axis line, "L", of the automotive wheel is called as an "inside" and its reverse direction is called as an "outside". A vertical direction is based on the position that the back faces the ground, that is, the front faces up the sky.

The present invention will now be described more fully hereinafter with reference to the accompanying drawings, in which the preferred embodiment(s) of the invention is shown so that those of ordinary skill in the art can easily carry out the present invention.

Figure 1:
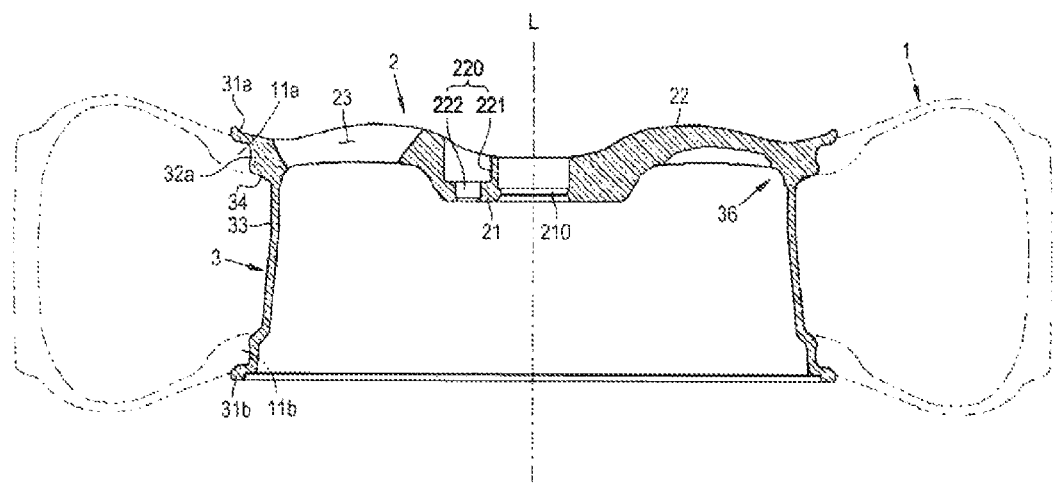
FIG. 1 is a cross-section view of an automotive wheel of the conventional art.

FIG. 1 shows an ordinary automotive wheel. A hub mounting section 21 is formed in a solid type, except for bolt holes 220.

In this automotive wheel, a section connected with an axle (not shown) is a support end to receive the load of a cantilever. Therefore, the reason to make the solid hub mounting section 21 is for the support end to have the strength to bear the weight of the automobile itself and the impulsive load.

An ordinary automotive wheel is integrally formed by casting an aluminium alloy and it includes a disk member 2 and a rim member 3 on which a tire 1 is mounted.

When the tire 1 is mounted on the automotive wheel, a tire air chamber in a ring shape is formed to be closed by the rim member 3 and the tire 1.

The disk member 2 includes the hub mounting section 21 in a nearly circular shape, and a plurality of spokes 22 positioned in a radial shape from an outer circumferential edge of the hub mounting section 21. The hub mounting section 21 includes a hub hole 210 and a plurality of bolt holes 220. The hub hole 210 is formed in the center of the hub mounting section 21. The bolt holes 220 are positioned, at equally spaced intervals, in a radial shape around the outside of the hub hole 210 (in a peripheral direction of the wheel). A decorative opening 23 may be formed between the adjacent spokes 22.

A spoke extension section extending from the spokes 22 and the decorative openings 23 is formed in a circular shape to be connected with the rim member 3.

The rim member 3 includes a front flange 31a and a back flange 31b at both front and back ends of the rim member 3. The front flange 31a and the back flange 31b are to keep beads 11a, 11b of the tire 1. A front bead seat 32a and a back bead seat 32b are positioned to be coupled to the front flange 31a and the back flange 31b, respectively, to support and secure the beads 11a, 11b to sit on the wheel.

A well 33 is positioned between the front bead seat 32a and the back bead seat 32b. The well 33 has a smaller diameter than the diameter of the front bead seat 32a, so that the tire beads release when the tire 1 is mounted. A well wall 34 is formed to connect the front bead seat 32a and the well 33 which are different from each other in diameter.

An automotive wheel with a cavity between the bolt holes in a hub mounting section according to the present invention provides improvements to the hub mounting section 21 and therefore it will be described focused on the improvements.

Figure 2:
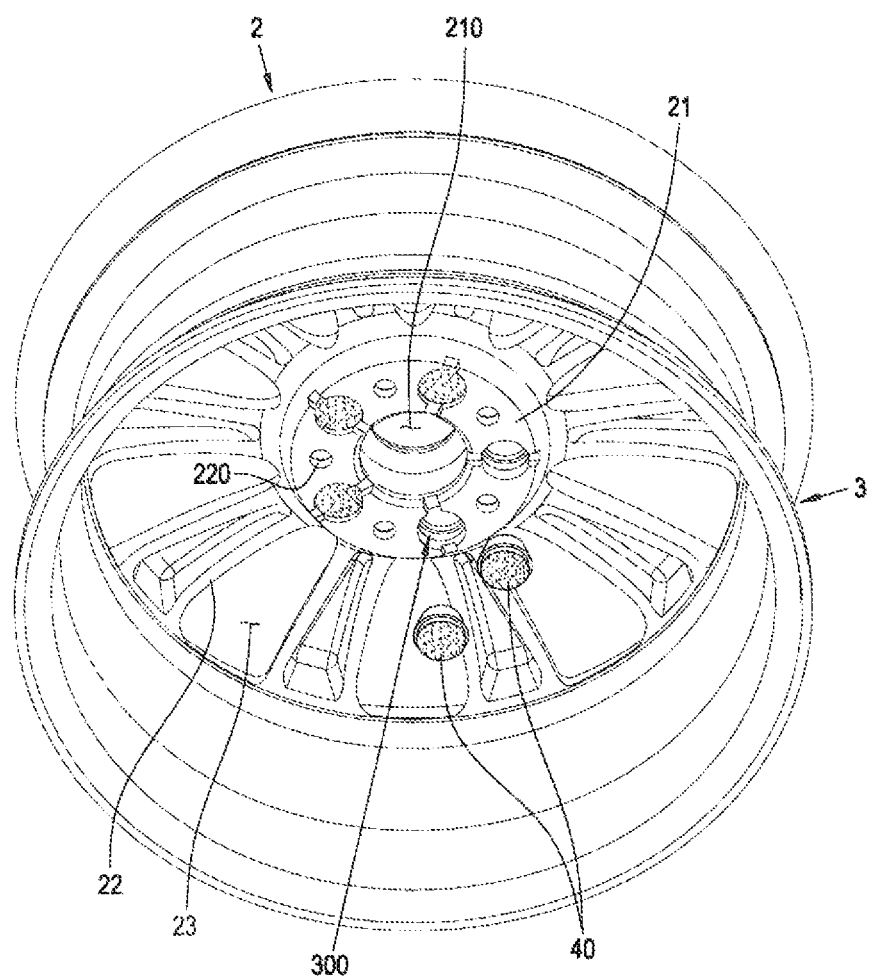
FIG. 2 is an entire perspective view of an automotive wheel according to an embodiment of the present invention.
Figure 3:
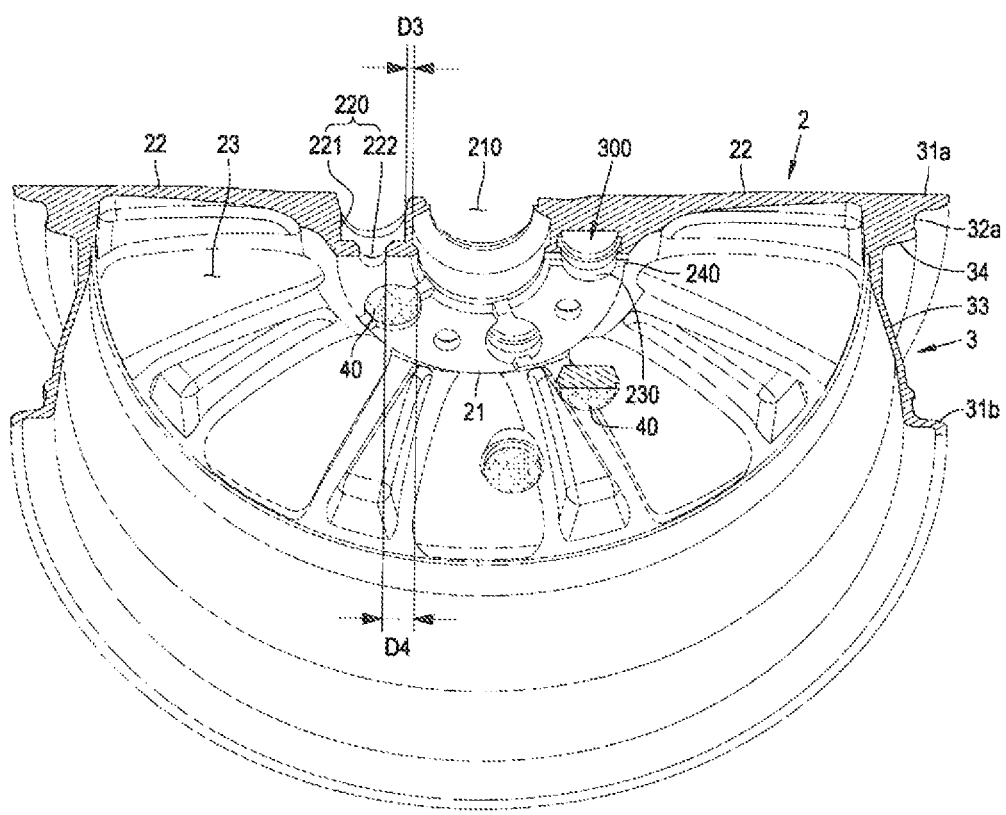
FIG. 3 is a cross-sectional perspective view of the automotive wheel according to the present invention.

In FIG. 2 and FIG. 3, the hub mounting section 21 includes a hub hole 210, a plurality of bolt holes 220 and a plurality of cavities 300. The hub hole 210 is positioned in the center of the hub mounting section 21. The bolt holes 220 are positioned, at equally spaced intervals, in a radial shape outside the hub hole 210. The cavities 300 are positioned at equal intervals among the bolt holes 220.

An axle (not shown) is connected through the hub hole 210. A wheel hub (not shown) and bolts (not shown) are secured through the bolt holes 220. To this end, the bolt holes 220 are threaded even, not shown.

If the cavity 300 has a structure to offset, in a wide cavity, noise passing through a narrow entrance being circular, oval or polygonal in cross section, the present invention does not limit the shape thereof.

Therefore, when noise generated during driving enters into the cavity 300, it is offset in the cavity through mutual interference, to provide comfort during driving.

Further, since the cavities 300 are formed, the weight is decreased by about 10~15% while maintaining the same strength.

The cavity 300 includes an extension portion 320 inside. The inner diameter d1 of the extension portion 320 is greater than the diameter of an entrance 310 and that of the bolt hole 220.

Referring to FIG. 2 through FIG. 5, the inner diameter d1 of the extension portion 320 of each cavity 300 is formed to be greater according to a preferred embodiment of the present invention. Therefore, the five cavities 300 function as five (5) Helmholtz resonance absorbers (see FIG. 2).

A sound frequency enabling a decrease is defined according to the capacity of the cavity 300, the opening diameter and length, etc. of the entrance 310, such that each cavity 300 has the effect of decreasing the road noise generated during driving. Therefore, the capacity of the cavity 300, the opening diameter and length of the entrance 310 are defined to decrease the sound wave of a specific frequency band (for example, 180 Hz~270 Hz) causing a resonance in the road noise.

In the embodiment of the present invention, the five (5) cavities 300 are designed to have the same capacity. However, the capacity of each cavity and the size of the entrance may vary to decrease a number of sound waves within the range of the specific frequency band.

Further, the inner diameter d1 inside the cavity 300 may be formed to be greater than the bolt hole 220, to maximize the effect of decreasing the weight.

The axle is connected through the hub hole 210 of the hub mounting section 21 and the wheel hub is secured through the bolt holes 220 of the hub mounting section 21 using bolts. Therefore, in consideration of the strength of the wheel, the factors to maintain the strength of the axle and the hub mounting section 21 are the distance D1 from the outer diameter of the hub hole 210 to the outer diameter of the extension portion 320 of the cavity 300, and the capacity of the hub mounting portion 20 where the cavities 300 are not formed, that is, the distance D2 from the contact side of the cavity 300 to the front.

In FIG. 3, the bolt hole 220 includes a bolt head receiving portion 221 and a screw inserting portion 222. The bolt head receiving portion 221 has a wide diameter to safely receive the head of the bolt which is inserted from the front. The screw inserting portion 222 has a narrow diameter to receive the screw of the bolt inserted. Here, the factor to influence on the strength of the wheel is the distance D3 from the outer diameter of the bolt head receiving portion 221 to the outer diameter of the hub hole 210.

Therefore, it is preferable to make the distance D1 from the outer diameter of the hub hole 210 to the outer diameter of the extension portion 320 of the cavity 300 to be the same as the distance D3 to the outer, diameter of the bolt head receiving portion 221 to the hub hole 210, to form the length l1 of the cavity 300 to be about ½ of the thickness of the hub mounting section 21 and to form the entrance 310 of the cavity 300 in the back.

The stiffness of the front where the distance D3 to the outer diameter of the bolt head receiving portion 221 to the hub hole 210 is narrow can be secured by the hub mounting section 21 which is solid where no cavities are formed. The stiffness of the back where the distance D1 from the outer diameter of the hub hole 210 to the outer diameter of the extension portion 320 of the cavity 300 is narrow can be secured by the hub mounting section 21 where the distance D4 is wide through the screw inserting portion 222 having a narrow diameter.

Accordingly, it is preferable to form the entrance 310 of the cavity 300 in the back.

Considering the aforementioned factors of the strength of the automotive wheel in design, it is also important to select the optimum capacity of the cavity 300 to decrease the weight of the wheel while maintaining the strength of the wheel.

Figure 4:
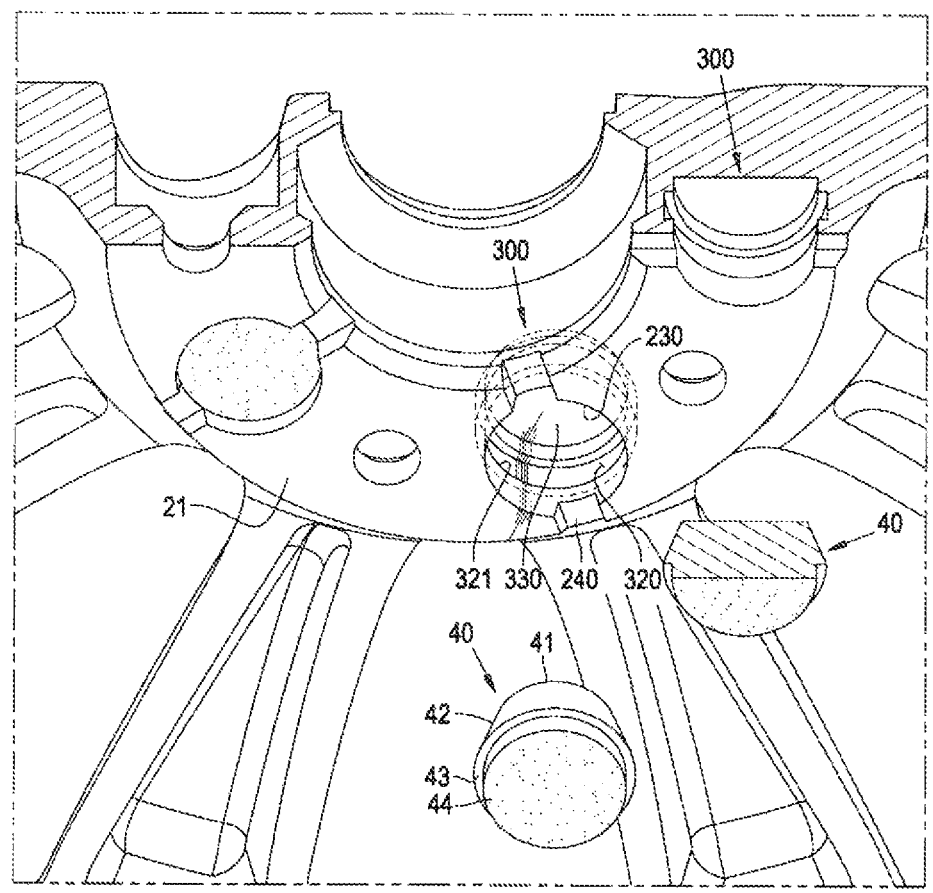
FIG. 4 is an enlarged perspective view of main parts of the automotive wheel according to the present invention.

Referring to FIG. 4, the hub mounting section 21 in the back includes a drain hole 230 and a drain slit 240. The drain hole 230 around the cavity 300 is formed to be recessed from the flat surface of the hub mounting section 21 in the back. The drain slits 240 are formed in the drain hole 230 in a radial shape towards the center of the axle.

The flat surface of the hub mounting section 21 in the back is in contact with the wheel hub when the automotive wheel is assembled to the wheel hub. The drain slits 240 formed in the drain hole 230 are formed to be recessed from the flat surface of the hub mounting section 21 in the back, to form a drainage channel. Therefore, when the automotive wheel is assembled to the wheel hub, rain water, etc, is discharged, through the drain slits 240 to the outside of the rotating wheel.

Here, it is preferable to form the entrance 310 of the cavity 300 to be level with the drain slit 240, to enhance the drainage efficiency.

Figure 5:
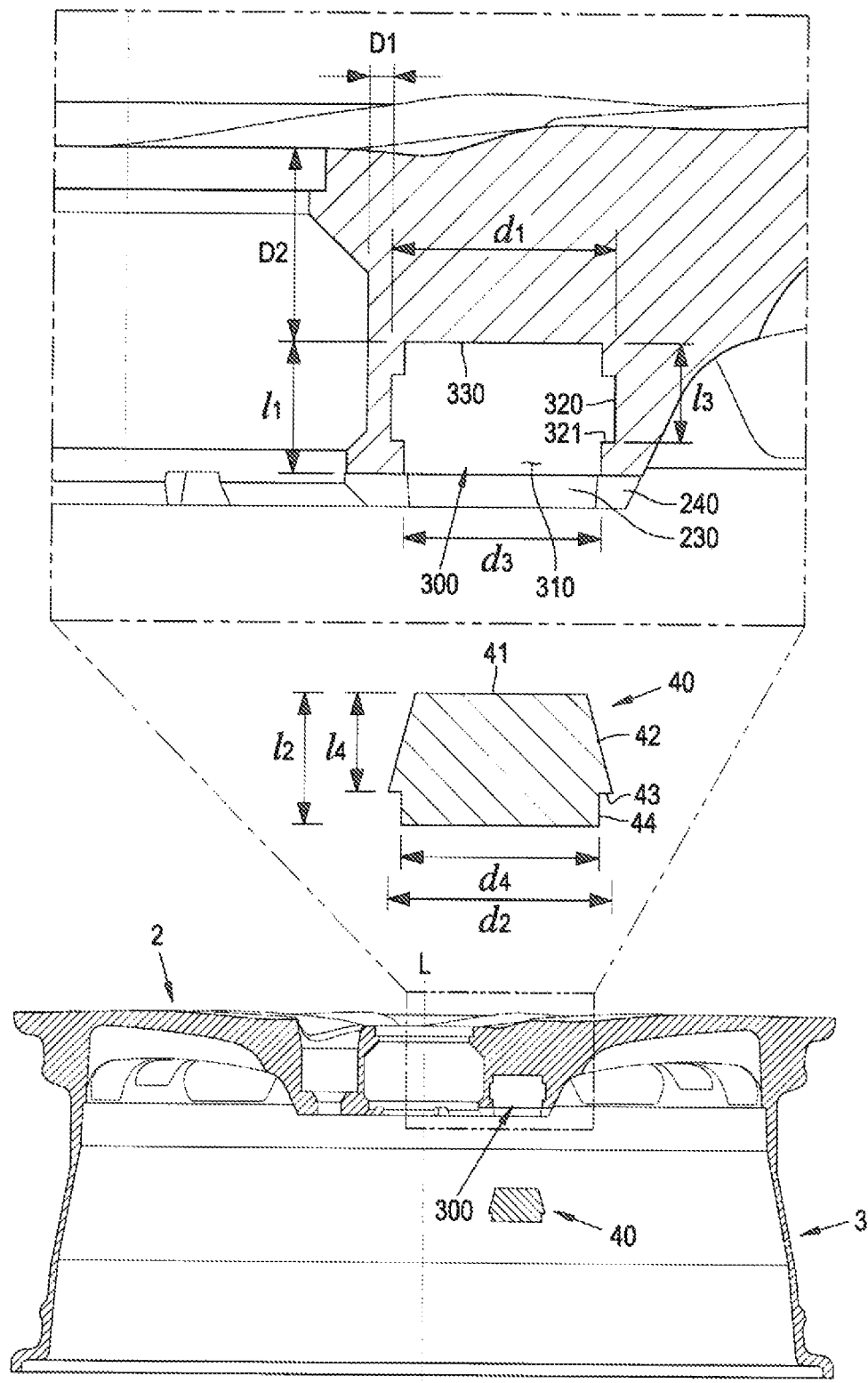
FIG. 5 is a cross-sectional view of the automotive wheel according to the present invention.
Figure 6:
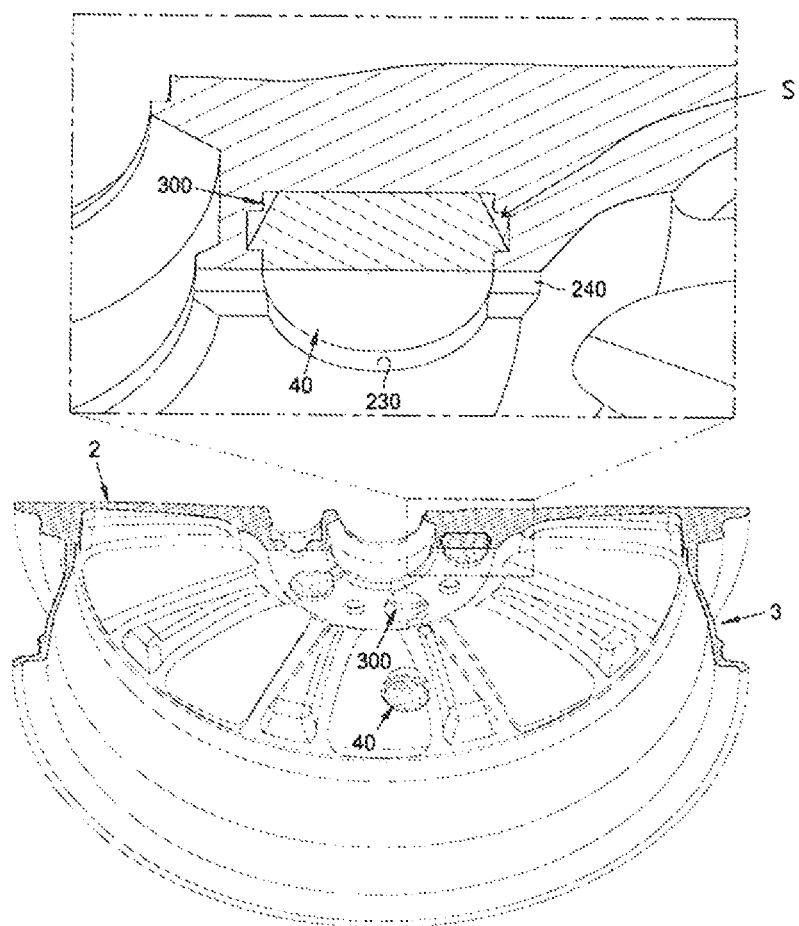
FIG. 6 is a cross-sectional enlarged perspective view of the main parts of the automotive wheel according to the present invention.

Referring to FIG. 5 and FIG. 6, a damper rubber 40 may be further inserted into the cavity 300, not only to decrease the noise but also to provide impact absorption and buffer function.

To this end, the damper rubber 40 may be any one of chloroprene rubber (CR), nitrile rubber (NBR: nitrile-butadiene rubber), ethylene propylene rubber (EPDM: ethylene propylene diene monomer), fluororubber (FPM; fluorocarbon rubber), polybutadiene rubber (BR), styrene-butadiene rubber (SBR), isobutylene isoprene rubber (IIR) and chlorosulphonated polyethylene (CSM) rubber.

Since the properties of the rubber are well-known, no detailed description is presented.

The damper rubber 40 includes a contact portion 41 being in contact with the cavity 300, an incline portion 42 being tapered from the contact portion 41 such that an inner diameter widens, a shaft diameter portion 43 narrowing the inner diameter from the incline portion 42, and a vertical portion 44 being vertical from the axial portion 43.

The contact portion 41 of the damper rubber 40 is in contact with a contact portion 330 of the cavity 300, so that these portions may be in contact with each other by side to side, line to line or point to point.

Since the incline portion 42 is formed to be tapered such that the inner diameter widens from the contact portion 41, a certain closed space S is formed within the cavity 300. Therefore, the noise generated during driving is decreased in the closed space S and the vibration is decreased by the damper rubber 40 inserted into the cavity 300.

The shaft diameter portion 43 is designed to sharply narrow the inner diameter from the incline portion 42, to be in contact with a support portion 321 of the extension portion 320 of the cavity 300.

Figure 7:
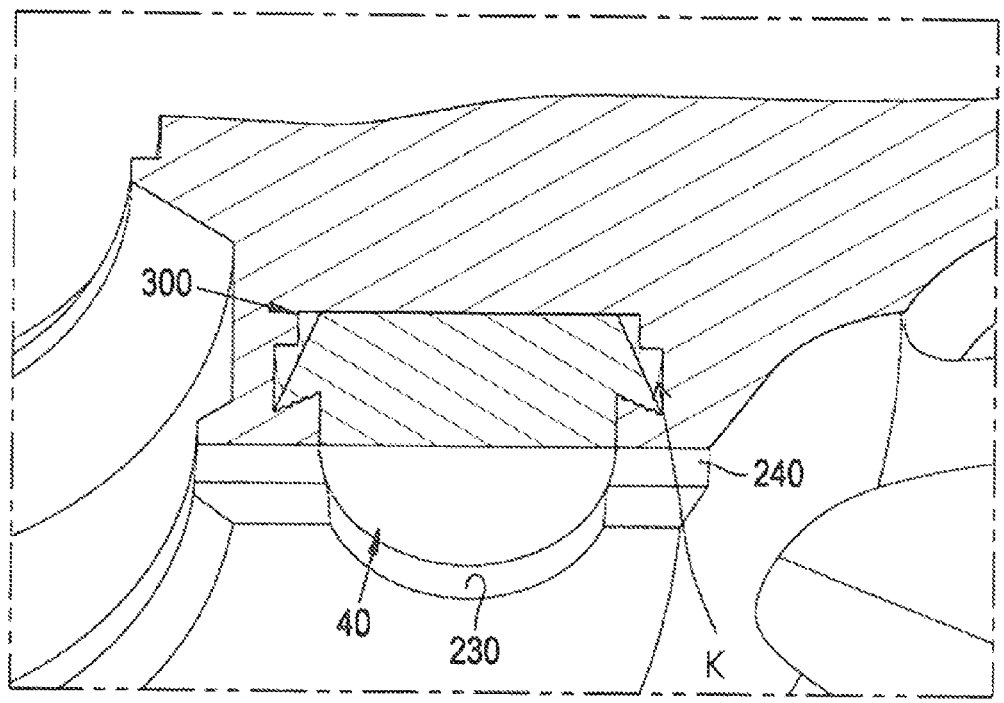
FIG. 7 is an enlarged perspective view of main parts according to another embodiment of the present invention.

The incline portion 42 and the support portion 321 may be in contact with each other by side to side, line to line, or point to point. However, it is preferable that the incline portion 42 and the support portion 321 are in contact with each other by correspondingly side to side, to improve the support force. The damper rubber 40 is formed horizontally but may be formed to be tilted to prevent its loss as shown in FIG. 7. Further, the incline portion 42 and the support portion 321 may be formed in a wave shape or a concavoconvex shape K, to increase the griping force. Thereby, the damper rubber 40 inserted into the cavity 300 does not dislodge by itself during driving.

The vertical portion 44 vertically extends from the shaft diameter portion 43 and circumscribes with the entrance 310 of the cavity 300.

The outer diameter d2 of the damper rubber is formed to be the same as or slightly greater than the inner diameter d1 of the extension portion 320 and the outer diameter d4 of the vertical portion 44 is formed to be the same as or slightly greater than the inner diameter d3 of the entrance 310 of the cavity 300, thereby keeping the closing/sealing force to maximize the effect of decreasing the vibration and to prevent foreign materials from entering the cavities 300.

The length l2 of the damper rubber 40 is formed to be the same as the length l1 of the cavity 300, to be level with the flat surface of the drain slit 230, thereby maximizing the drainage efficiency. The length l4 of the incline portion 42 is formed to be the same as or slightly greater than the length l3 of the extension portion 320, to improve the closing/sealing force.

In the automotive wheel with the cavity between the bolt holes in the hub mounting section according to the present invention, the cavity is formed between the bolt holes in the hub mounting section and the damper rubber is inserted into the cavity, thereby having the effect of decreasing the weight by about 10~15% while maintaining the same strength.

Further, the present invention has the effect of significantly decreasing the vibration generated during driving the automobile by the damper rubber.

Further, since the incline portion is formed in the damper rubber, the closed space is formed in the state that the damper rubber is inserted into the cavity. Therefore, the present invention has the effect of significantly decreasing the noise generated during driving the automobile through the space.

Further, since the support portion is formed in the cavity and the shaft diameter portion is formed in the damper rubber, the present invention has the effect that the damper rubber inserted into the cavity does not dislodge even during high-speed driving.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. An automotive wheel with a cavity between the bolt holes in a hub mounting section, comprising a disk member (2) through which an axle is connected and a rim member (3) on which a tire is to be mounted,
    the disk member (2) includes: a hub mounting section (21) in a circular shape through which the axle is connected and a plurality of spokes (22) positioned in a radial shape from an outer circumferential edge of the hub mounting section (21),
    the hub mounting section (21) further includes: a hub hole (210) in its center; a plurality of bolt holes (220) positioned, at equally spaced intervals, in a radial shape outside the hub hole (210); and a plurality of cavities (300) defined on said hub mounting section (21) and positioned, at equally spaced intervals proximate the bolt holes (220) said cavities are configured to reduce vibration and noise, and
    the cavity (300) includes an entrance (310) formed in the back.

2. The automotive wheel of claim 1, wherein each of the cavities (300) is circular, oval or polygonal in cross section.

3. The automotive wheel of claim 1, further comprising: a damper rubber (40) inserted into each cavity (300).

4. The automotive wheel of claim 3, wherein the damper rubber (40) is any one of chloroprene rubber (CR), nitrile rubber (NBR: nitrile-butadiene rubber), ethylene propylene rubber (EPDM: ethylene propylene diene monomer), fluororubber (FPM; fluorocarbon rubber), polybutadiene rubber (BR), styrene-butadiene rubber (SBR), isobutylene isoprene rubber (IIR) and chlorosulphonated polyethylene (CSM) rubber.

5. The automotive wheel of claim 3, wherein each cavity (300) includes an extension portion (320) inside.

6. The automotive wheel of claim 5, wherein the damper rubber (40) comprises:
    a contact portion (41) to be in contact with the cavity (300);
    an incline portion (42) to be tapered such that an inner diameter is widened from the contact portion (41);
    a shaft diameter portion (43) to narrow the inner diameter from the incline portion (42); and
    a vertical portion (44) to be formed vertically from the shaft diameter portion (43).

7. The automotive wheel of claim 5, wherein the hub mounting section (21) in the back comprises:
    a drain hole (230) formed around each cavity (300) so as to be recessed from the flat surface of the hub mounting section (21) in the back; and
    drain slits (240) formed in the drain hole (230) in a radial shape towards the center of the axle.

* * * * *